Patented Aug. 28, 1928.

1,682,294

UNITED STATES PATENT OFFICE.

LEON LILIENFELD, OF VIENNA, AUSTRIA.

CELLULOSE DERIVATIVE AND PROCESS FOR PRODUCING SAME.

No Drawing. Application filed July 23, 1924, Serial No. 727,804, and in Austria April 4, 1924.

It is known that cellulose compounds which in the form of their neutrally reacting alkali salts are soluble in water may be produced by the action of chloracetic acid on cellulose in the presence of an alkali and alcohol. After the reaction is completed they are isolated from the alkaline reaction mixture by neutralizing it or its aqueous solution, and treating it with alcohol or the like. The residues or preciptates obtained by this method (according to whether alcohol has been added to the reaction mixture as such or to its solution) are then freed from salts and alkalies by treatment with dilute alcohol. The final products may be used as a substitute for gelatine.

According to the present invention, by the action of a monohalogen derivative of a fatty acid on cellulose in the presence of alkalies and alcohol there may be obtained cellulose derivatives which differ in their technically valuable properties from those hitherto known by using not more than 0.5 molecular proportion of the monohalogen fatty acid to one molecular proportion of caustic alkali. The products are insoluble in water, but are soluble in aqueous alkalies and may be precipitated from their solutions in alkalies by the addition of a reagent which will neutralize the alkali, such as an acid, an acid salt or the like, even when the mixture is still alkaline in reaction, but certainly when it is neutral in reaction. If their solutions in aqueous alkalies be treated with alcohol, there are obtained precipitates which after they have been freed from free alkali by washing with dilute alcohol (for example of 50 to 90 per cent strength) are insoluble in water. They do not therefore yield any neutral water-soluble salts of alkali metals. The alkaline solutions or pastes of the new cellulose derivatives yield, when they are brought into a suitable form and treated with a suitable precipitating agent such as an acid, a salt, an acid and a salt, an acid salt, an alcohol or the like, transparent products which are insoluble in water, such as films, threads and the like which after being washed and dried are strong and flexible. The cellulose derivatives which may be made according to the invention are accordingly suitable for many technical purposes for which the cellulose compounds hitherto obtained by the interaction of cellulose and a halogen fatty acid in the presence of an alkali are unsuitable.

The new cellulose derivatives may be worked either by themselves or mixed with other colloids or binding agents, which are soluble in water or in aqueous alkalies, into a whole series of technical products, such as artificial threads (such as artificial silk), films, plates, plastic compositions, coatings and coverings of all kinds, finishing compositions, insoluble in water, for textiles, preparations for sizing yarns, thickening agents for textile printing, fixing agents for pigments, binding agents, book cloth, and the like.

The process may be carried out in a very simple manner. It consists essentially in treating bleached or unbleached cellulose, a material containing cellulose, or a conversion product of cellulose with a monohalogen fatty acid or a salt or a derivative thereof, such as an ester, in a dissolved or an undissolved condition, in the presence of an alkali and of an aliphatic alcohol. This treatment may be carried out at ordinary temperature, at a lower temperature or at a raised temperature. The addition of the alkali may be carried out either by impregnating the cellulose with an excess of the solution of the alkali and then removing the excess of the alkali solution by pressing, centrifuging or the like, or by mixing or kneading the cellulose with the quantity of the alkali solution which it is intended to use, or by mixing or kneading the cellulose or alkali cellulose with a solid caustic alkali or with a mixture of a solid caustic alkali and a saturated alkali solution.

The alcohol may either be added to the cellulose with the alkali solution and therefore in the form of an alcoholic or aqueous alcoholic alkali solution, or with the halogen fatty acid or the salt or derivative thereof.

As regards the quantity of monohalogen fatty acid to be used it has been found convenient to use less of the monohalogen fatty acid the stronger the alkali solution. In cases in which the caustic alkali solution contains more than 15% (calculated as NaOH) the relation between the quantities employed may be expressed with sufficient accuracy for the practical application of the process by the rule that not more than $\frac{8a}{a^2}$ molecular proportions of the monohalogen fatty acid should be used to one molecular proportion of the caustic alkali, wherein *a* denotes the percentage strength of the alkali solution that is to say, the amount of alkali which is contained in 100 parts by weight of the alkali solution present. It is of course obvious that if the parent material is a free halogen fatty acid and not a neutral salt thereof, it will be necessary to base the determination of the permissible maximum amount of the halogen fatty acid on the strength of the alkali solution according to the percentage of alkali which remains after deducting the quantity of alkali neutralized by the fatty acid. When the halogen fatty acid or its salt is used in aqueous solution, the water contained in its solution must be taken into account when calculating the strength and quantity of the solution of the alkali.

The working up of the reaction mixture after the reaction may be carried out for example by bringing the reaction mixture into solution by the addition of water (if sufficient unused alkali is present) or of dilute alkali solution (for instance caustic soda solution of 3 to 10 per cent strength) and using this solution or paste for the technical purpose for which it is intended after it has been previously freed if necessary from any undissolved constituents that may be present by straining or filtration or the like. The product of the reaction may however also be isolated from the reaction mixture in various ways. Thus for example two methods will be described: The reaction mixture, if necessary after neutralization of the free alkali or after acidification (particularly when there is present a large amount of free alkali) is washed with water and the residue is dried after having been dehydrated with alcohol if desired. Or, the reaction mixture may be dissolved by the addition of water or dilute alkali, the solution is filtered, strained or centrifuged if necessary, and is then mixed with an acid or with some other reagent which will fix the alkali, such as an ammonium salt for example, in quantity sufficient for complete precipitation, or in excess, the precipitate is thoroughly washed with water and if desired dried. The substance which may be isolated by any method may be purified by dissolving in an alkali and precipitating with an acid or the like.

The following examples illustrate the invention, the parts being by weight:

1. 100 parts of sulphite-cellulose (in fleece- or sheet-form), or cotton linters are impregnated with a solution of caustic soda prepared by dissolving 600 parts of caustic soda in 635 parts of water and then adding 1000 parts of alcohol of 96 per cent strength, and the mixture is allowed to stand in a tightly closed vessel for 10 to 24 hours at ordinary temperature. The mass is then pressed until it is 850 to 900 parts and is comminuted until it is uniform in a cooled and tightly closed shredder. The proportion of caustic soda (NaOH) contained in the soda-cellulose as determined by titration is about 30 per cent. The soda-cellulose is then slowly mixed either immediately after its disintegration or after being allowed to ripen for a long or short period (for instance, from 3 to 72 hours), with 50 to 55 parts of monochloracetic acid, which has been dissolved in 25 to 30 parts of water, and the mixture is thoroughly kneaded. A sample taken even after a few hours shows that the reaction mass has become soluble, at least in greater part, in a dilute solution of caustic soda. The reaction mixture which has the appearance of unchanged soda-cellulose, is practically insoluble in water. Thereupon, or after allowing to stand for from 10 to 30 hours, the mixture, either as such or after having been previously neutralized or acidified and washed, or merely washed, is dissolved in a dilute solution of caustic soda for instance of 4–8 per cent strength, and put to the technical use for which it is intended; or the product contained therein is isolated. For this purpose the reaction mass is dissolved in from 6000 to 12000 parts of a solution of caustic soda of 5–8 per cent strength, the solution freed from any undissolved constituents by filtering, straining, centrifuging or the like, and mixed with a dilute acid for instance sulphuric acid or acetic acid of 10–20 per cent strength, until the cellulose-glycollic acid is completely precipitated. The substance which is precipitated in flakes or lumps is now freed from the mother liquor by means of a filtering apparatus (such as a filter press, a suction filter, a filter or the like) washed with water until free from acid and salts and, if necessary, after previously dehydrating with alcohol and washing with ether, dried at atmospheric or reduced pressure. After being ground it forms a white powder, which is insoluble in water or in organic solvents, but soluble in dilute alkalies for instance a solution of caustic soda of 5 to 8 per cent strength. A solution of the substance for instance of 5 to 10 per cent strength in a solution of caustic soda is clear and viscous and, when spread on a glass plate and treated with a dilute acid or with any precipitating agent known in the viscose industry, yields a clear tough film which after being washed and dried is transparent and flexible.

If the substance be dissolved in dilute caustic soda, for instance of 8 per cent strength and the clear solution mixed with alcohol, a precipitate is obtained which after being washed with dilute alcohol (for instance, of 50 to 80 per cent strength) is insoluble both in cold and in hot water.

If a normal solution of sulphuric acid be added drop by drop to a solution of 1 gram of substance in 60 grams of a normal caustic soda solution, precipitation is approximately complete when the amount of caustic soda contained is about 71 per cent reckoned on the substance, and 1.16 per cent reckoned on the original solution, i. e., 0.68% reckoned on the solution present when precipitation is completed.

If the substance be decomposed with hydriodic acid or by boiling it with concentrated hydrochloric acid or even by heating it with dilute hydrochloric acid under pressure, glycollic acid is split off, and may easily be recognized, as is well known, for example by oxidation to oxalic acid by means of nitric acid.

2. 100 parts of sulphite-cellulose are impregnated with a solution of caustic soda prepared by dissolving 400 parts of caustic soda in 650 parts of water and mixing the solution with 1150 parts of alcohol of 96 per cent strength. After being allowed to stand for 6 to 24 hours at ordinary temperature the mass is pressed to 650 to 700 parts (the proportion of caustic soda, NaOH, contained in the soda-cellulose as determined by titration is from 19 to 20 per cent), then comminuted and, either immediately after its comminution or after being allowed to ripen for 3 to 72 hours, is treated with 60 parts of monochloracetic acid (dissolved in 50 parts of water) added in small quantities, and the mixture is thoroughly kneaded. The further working up of the substance is carried out as described in Example 1.

The appearance and the properties of the final product correspond with those of the substance described in Example 1.

3. 100 parts of sulphite-cellulose or cotton linters are saturated with a solution of caustic soda prepared by dissolving 400 parts of caustic soda in 666 parts of water and then adding 1150 parts of alcohol of 96 per cent strength. After the mass has been allowed to stand for 12 to 24 hours at ordinary temperature it is pressed to 355 parts (the proportion of caustic soda, NaOH, contained in the soda cellulose as determined by titration is 17.89 per cent) and then comminuted for about one hour in a cooled and tightly closed shredder. The soda-cellulose either immediately after its disintegration or after it has been allowed to stand for 3 to 72 hours, is then mixed with 32 to 35 parts of monochloracetic acid, which has been dissolved in 32 to 35 parts of water and neutralized with powdered sodium bicarbonate (a suspension of crystals is thus obtained), and the mixture is kneaded or ground. The further treatment of the mass is carried out as described in the preceding examples.

The finished cellulose-glycollic acid corresponds in its properties with the products obtained according to the preceding examples.

In the foregoing examples there may be used instead of the monochloracetic acid a halogen derivative of a homologue of acetic acid, such as $\alpha$-bromo- or $\alpha$-chloro-propionic acid, $\beta$-iodopropionic acid, bromosuccinic acid, $\alpha$-bromoisobutyric acid, or the like or alkali salt or an ester thereof.

Instead of bleached or unbleached cellulose, there may also be used a parent material a conversion product of cellulose which is insoluble in alkalies (for instance a cellulose hydrated or hydrolyzed by chemical action, such as mercerization, with subsequent washing and, if necessary, drying, by the action of a strong mineral acid, by heating with a weak mineral acid, by treatment with a zinc halide, or by a mechanical process such as grinding in the presence of water, or the like, or an oxycellulose insoluble in alkalies), in short any body of the cellulose group which comes into consideration in the manufacture of viscose or ammoniacal-copper-oxide-cellulose.

In the specification and the claims the expression "cellulose" includes wherever the context permits, the bodies of the cellulose group herein enumerated.

In order to accelerate the reaction, the parent soda-cellulose may be warmed, or the reaction mixture itself may be warmed. A contact substance, such as copper, iron, silver, benzoyl-superoxide or the like, may also be added to the reaction mixture.

It is to be distinctly understood that by the present claims I intend to include in the processes defined therein the use of monohalogen fatty acids, such as, for example, monochloro-, monobromo- and monoiodo; their derivatives (such as the esters) and salts, whether these compounds are added as such to the reaction mixture or formed therein by the interaction of suitable reagents.

The expression "in any form" used in the claims is intended to mean flocculæ, powder, sand, crumbs, grains, solutions, and the like.

I claim:

1. A process for the manufacture of cellulose derivatives, which dissolve in aqueous solutions of alkalies and are precipitated from such solutions by the addition of reagents which neutralize the alkali, even when the reaction is still alkaline but certainly when it is neutral, and which by mixing their alkali solutions with alcohol and freeing the precipitates so obtained from free alkali by washing with aqueous alcohol yield products which are insoluble in water, which process comprises treating cellulose with a compound containing the halogen containing radical of a monohalogen fatty acid in the presence of an alkali and of an alcohol, using not more than 0.5 molecular proportion of the monohalogen fatty acid radical for each molecular proportion of the caustic alkali.

2. A process for the manufacture of cellulose derivatives, which dissolve in aqueous solutions of alkalies and are precipitated from such solutions by the addition of reagents which neutralize the alkali, even when the reaction is still alkaline but certainly when it is neutral, and which by mixing their alkali solutions with alcohol and freeing the precipitates so obtained from free alkali by washing with aqueous alcohol yield products which are insoluble in water, which process comprises treating cellulose with a compound containing the halogen containing radical of a monohalogen fatty acid in the presence of an alkali and of an alcohol, using not more than $$\frac{8a}{a^2}$$

molecular proportions of the monohalogen fatty acid radical, in cases in which the caustic alkali solution contains more than 15 per cent, for each molecular proportion of the caustic alkali present wherein $a$ denotes the percentage strength of the alkali solution, that is to say, the quantity of alkali which is contained in 100 parts of the alkali solution.

3. A process for the manufacture of cellulose derivatives, which dissolve in aqueous solutions of alkalies and are precipitated from such solutions by the addition of reagents which neutralize the alkali, even when the reaction is still alkaline but certainly when it is neutral, and which by mixing their alkali solutions with alcohol and freeing the precipitates so obtained from free alkali by washing with aqueous alcohol yield products which are insoluble in water, which process comprises treating cellulose with a compound containing the halogen containing radical of a monohalogen fatty acid in the presence of an alkali and of an alcohol, using not more than 0.3 molecular proportion of the monohalogen fatty acid radical for each molecular proportion of the caustic alkali.

4. A process for the manufacture of cellulose derivatives, which dissolve in aqueous solutions of alkalies and are precipitated from such solutions by the addition of reagents which neutralize the alkali, even when the reaction is still alkaline but certainly when it is neutral, and which by mixing their alkali solutions with alcohol and freeing the preciptates so obtained from free alkali by washing with aqueous alcohol yield products which are insoluble in water, which process comprises treating cellulose with a compound containing the chlorine containing radical of monochloracetic acid in the presence of an alkali and of an alcohol using not more than 0.5 molecular proportions of monochloracetic acid radical for each molecular proportion of the caustic alkali.

5. A process for the manufacture of cellulose derivatives, which dissolve in aqueous solutions of alkalies and are precipitated from such solutions by the addition of reagents which neutralize the alkali, even when the reaction is still alkaline but certainly when it is neutral, and which by mixing their alkali solutions with alcohol and freeing the precipitates so obtained from free alkali by washing with aqueous alcohol yield products which are insoluble in water, which process comprises treating cellulose with a compound containing the chlorine containing radical of monochloracetic acid in the presence of an alkali and of an alcohol, using not more than 0.3 molecular proportion of the monochloracetic acid radical for each molecular proportion of the caustic alkali.

6. A process for the manufacture of cellulose derivatives, which dissolve in aqueous solutions of alkalies and are precipitated from such solutions by the addition of reagents which neutralize the alkali, even when the reaction is still alkaline but certainly when it is neutral, and which by mixing their alkali solutions with alcohol and freeing the precipitates so obtained from free alkali by washing with aqueous alcohol yield products which are insoluble in water, which process comprises treating cellulose with a compound containing the halogen containing radical of a monohalogen fatty acid in the presence of an alkali and of an alcohol, using not more than 0.5 molecular proportion of the monohalogen fatty acid radical for each molecular proportion of the caustic alkali, and dissolving the crude reaction mixture containing the product in an alkali which latter operation may be effected by merely adding water in cases where there is a large excess of alkali present.

In testimony whereof I affix my signature.

Dr. LEON LILIENFELD.